(12) United States Patent
Byun et al.

(10) Patent No.: US 12,448,234 B2
(45) Date of Patent: Oct. 21, 2025

(54) CONTROL SYSTEM AND METHOD FOR LOADING AND UNLOADING BY MULTI-AXIS ROBOT

(71) Applicant: ZHONGDI ROBOT (YANCHENG) CO., LTD, Yancheng (CN)

(72) Inventors: Suk Byun, Yancheng (CN); Jiacheng Chen, Yancheng (CN); Chao Wu, Yancheng (CN); Yadong Yang, Yancheng (CN)

(73) Assignee: ZHONGDI ROBOT (YANCHENG) CO., LTD, Yancheng (CN)

( * ) Notice: Subject to any disclaimer, the term of this patent is extended or adjusted under 35 U.S.C. 154(b) by 317 days.

(21) Appl. No.: 18/198,292

(22) Filed: May 17, 2023

(65) Prior Publication Data

US 2023/0382664 A1 Nov. 30, 2023

Related U.S. Application Data

(63) Continuation of application No. PCT/CN2022/140515, filed on Dec. 21, 2022.

(30) Foreign Application Priority Data

May 27, 2022 (CN) .......................... 202210591652.1

(51) Int. Cl.
*B65G 61/00* (2006.01)
*B25J 9/16* (2006.01)
(Continued)

(52) U.S. Cl.
CPC ............ *B65G 61/00* (2013.01); *B25J 9/1679* (2013.01); *B25J 9/1697* (2013.01); *B25J 13/06* (2013.01);
(Continued)

(58) Field of Classification Search
CPC . B25J 13/06; B25J 13/089; B25J 19/06; B25J 9/1679; B25J 9/1687; B25J 9/1697;
(Continued)

(56) References Cited

U.S. PATENT DOCUMENTS

| | | | | |
|---|---|---|---|---|
| 5,937,143 | A | * | 8/1999 | Watanabe .............. B25J 9/1671 700/264 |
| 2018/0150058 | A1 | * | 5/2018 | Shapiro .............. G05B 19/4093 |
| 2023/0052515 | A1 | * | 2/2023 | Kanunikov ............ B25J 19/023 |

FOREIGN PATENT DOCUMENTS

| CN | 110181521 A | | 8/2019 |
|---|---|---|---|
| CN | 111037351 A | * | 4/2020 |

(Continued)

OTHER PUBLICATIONS

Translation of CN-111579558 (Year: 2020).*
Translation of CN-111037351 (Year: 2020).*
Translation of JP-2010152664 (Year: 2008).*

*Primary Examiner* — Adam R Mott
*Assistant Examiner* — James Miller Watts, III
(74) *Attorney, Agent, or Firm* — Bayramoglu Law Offices LLC

(57) ABSTRACT

A control system and method for loading and unloading by a multi-axis robot are provided. The control system includes: a loading module configured to control the multi-axis robot to reach a loading position, adjust the multi-axis robot to a loading posture, and control a pick-and-place mechanism of the multi-axis robot to pick up a target material in a target loading trough and place the target material in a pick-and-place part of the multi-axis robot; an operation module configured to control the multi-axis robot to transfer the target material in the pick-and-place part to a target station for processing; and an unloading module configured to control the multi-axis robot to reach the target station, adjust the pick-and-place part to an unloading posture, and control
(Continued)

the pick-and-place mechanism to pick up the product material and place the product material into a target unloading trough.

4 Claims, 2 Drawing Sheets

(51) Int. Cl.
*B25J 13/06* (2006.01)
*B25J 13/08* (2006.01)
*B25J 19/06* (2006.01)
*B65G 65/00* (2006.01)

(52) U.S. Cl.
CPC ............. *B25J 13/089* (2013.01); *B25J 19/06* (2013.01); *B65G 65/005* (2013.01)

(58) Field of Classification Search
CPC ...... B25J 9/1612; B25J 9/1664; B25J 9/1669; B65G 61/00; B65G 65/005; B65G 1/04; B65G 1/0485; B65G 43/08; B65G 47/90; B65G 1/137; G05B 2219/40006; Y02P 90/02
See application file for complete search history.

(56) References Cited

FOREIGN PATENT DOCUMENTS

| | | | |
|---|---|---|---|
| CN | 111579558 A | * | 8/2020 |
| CN | 113771057 A | | 12/2021 |
| CN | 114749981 A | | 7/2022 |
| JP | 2010152664 A | * | 7/2010 |

* cited by examiner

CONTROL SYSTEM AND METHOD FOR LOADING AND UNLOADING BY MULTI-AXIS ROBOT

CROSS REFERENCE TO THE RELATED APPLICATIONS

This application is a continuation application of International Application No. PCT/CN2022/140515, filed on Dec. 21, 2022, which is based upon and claims priority to Chinese Patent Application No. 202210591652.1, filed on May 27, 2022, the entire contents of which are incorporated herein by reference.

TECHNICAL FIELD

The present disclosure relates to the technical field of robots, and in particular to a control system and method for loading and unloading by a multi-axis robot.

BACKGROUND

With the rapid development of people's living standards, robots are increasingly applied in different fields. Traditional loading and unloading relies on manual labor, which results in significant labor costs. At present, robots are used for loading and unloading. However, during the loading process, the robot can only transport the material from one position to another, and cannot identify the material before transportation, which can easily lead to an error in the transported material. In addition, the transportation process is complex and disorderly, making it prone to an error. In view of this, the present disclosure proposes a control system and method for loading and unloading by a multi-axis robot.

SUMMARY

The present disclosure provides a control system and method for loading and unloading by a multi-axis robot. The present disclosure ensures that a transported material is a desired one through a material analysis before loading, ensuring the accuracy of loading, and provides a regular and orderly transportation process, ensuring smooth material transportation.

The control system for loading and unloading by a multi-axis robot includes:
a loading module configured to control the multi-axis robot to reach a loading position, adjust the multi-axis robot to a loading posture, and control a pick-and-place mechanism of the multi-axis robot to pick up a target material in a target loading trough and place the target material in a pick-and-place part of the multi-axis robot;
an operation module configured to control the multi-axis robot to transfer the target material in the pick-and-place part to a target station for processing, where a product material generated is temporarily stored at the target station; and
an unloading module configured to control the multi-axis robot to reach the target station, adjust the pick-and-place part of the multi-axis robot to an unloading posture, and control the pick-and-place mechanism of the multi-axis robot to pick up the product material at the target station and place the product material into a target unloading trough.

In a feasible implementation,
the control system further includes an emergency module, where
the emergency module includes an emergency stop button, a pause button, and a start button; and
the emergency module is configured to execute a corresponding task when a worker presses a designated button.

In a feasible implementation,
the loading module includes:
a loading positioning unit configured to acquire a current position of the multi-axis robot and a first position of the target loading trough;
a loading movement unit configured to control, based on a position relationship between the multi-axis robot and the target loading trough, the multi-axis robot to move to the loading position within a range of the target loading trough; and
a loading execution unit configured to adjust the multi-axis robot to the loading posture, pick up the target material in the target loading trough, and place the target material in the pick-and-place part of the multi-axis robot.

In a feasible implementation,
the unloading module includes:
an unloading positioning unit configured to acquire a current position of the multi-axis robot and a second position of the target unloading trough;
an unloading movement unit configured to control, based on a position relationship between the multi-axis robot and the target unloading trough, the multi-axis robot to move to an unloading position within a range of the target unloading trough; and
an unloading execution unit configured to adjust the multi-axis robot to the unloading posture, pick up the product material at the target station, and place the product material into the target unloading trough.

In a feasible implementation,
the operation module includes:
a control unit configured to control the multi-axis robot to enter a range of the target station;
a visual unit configured to acquire a range video stream generated when the multi-axis robot enters the range of the target station; and
an analysis and operation unit configured to:
analyze the range video stream, adjust a position of the pick-and-place part, and transfer the target material in the pick-and-place part to the target station for processing; and
determine, based on the range video stream, whether there is a product material generated at the target station; and place, if there is a product material generated at the target station, the product material at a designated position of the target station for temporary storage.

In a feasible implementation,
the loading module further includes: a loading analysis unit;
the loading positioning unit is further configured to:
mark the first position on a preset scene plan;
analyze a standard material type of the target material stored in the target loading trough corresponding to the first position;
calculate a first quantity of the standard material type, and acquire a standard material contour corresponding to each standard material type; and
generate a comparison layer based on each standard material contour, and gather all comparison layers to establish a material analysis model;

the loading analysis unit is configured to:

acquire a loading image of the loading position when the multi-axis robot is adjusted to the loading posture;

down-sample the loading image, and generate a sampling image based on a sampling result;

input the sampling image into the material analysis model, mark a material contour in the sampling image, generate a comparison image, and acquire a comparison result generated when the sampling image is passed through each comparison layer;

analyze the comparison result, calculate a quantity of a type of an existing target material in the target loading trough as a second quantity, and determine whether the second quantity is equal to the first quantity;

if the second quantity is not equal to the first quantity: analyze a convergence value of a preset interpolation function based on a specification of the sampling image;

match the convergence value with an interpolation method, and interpolate the comparison image by the interpolation method to generate an interpolated image;

acquire an interpolated material contour from the interpolated image, pair the interpolated material contour with each standard material contour, and extract a failed standard material contour as a target standard material contour; and acquire a target standard material type corresponding to the target standard material contour; and the loading execution unit is further configured to acquire a storage region of the target standard material type in the preset scene plan, and control the multi-axis robot to move to the storage region to execute a replenishment task.

In a feasible implementation, the analysis and operation unit includes:

a first generation subunit configured to:

frame the range video stream to generate a range image set;

perform global motion estimation on each frame of range image in the range image set, and acquire an estimated motion amount corresponding to each frame of range image; and establish a rectangular coordinate system, input all estimated motion amounts to an X axis, acquire a trend value of all the estimated motion amounts, de-jitter each frame of range image based on the trend value to acquire a processed range image, and generate a stable image set; and a second generation subunit configured to:

extract an end-frame image of the stable image set, mark a first image position of the target station and a second image position of the pick-and-place part in the end-frame image;

establish an initial motion path based on the first image position and the second image position;

acquire a background region of the end-frame image;

determine whether an overlap between the initial motion path and the background region is less than a preset overlap;

if the overlap between the initial motion path and the background region is less than the preset overlap: analyze the initial motion path, and extract a non-overlapped sub-path;

acquire an adjustment distance, corresponding to the background region, of each path point on the non-overlapped sub-path;

sort the adjustment distance in reverse order, take the path point as a path inflection based on a sorting result, and adjust a direction of each path inflection in order until the non-overlapped sub-path is overlapped with the background region, and generate a corrected motion path;

acquire, based on a volume of the multi-axis robot, an activity range of the multi-axis robot moving along the corrected motion path, adjust a position relationship between the corrected motion path and a foreground region based on the activity range, and generate a final motion path;

if the overlap between the initial motion path and the background region is greater than or equal to the preset overlap: regard the initial motion path as the corrected motion path, adjust the position relationship between the corrected motion path and the foreground region, and generate the final motion path; and control the multi-axis robot to move the pick-and-place part to the target position according to the final motion path.

The control method for loading and unloading by a multi-axis robot includes:

S1: controlling the multi-axis robot to reach a loading position, adjusting the multi-axis robot to a loading posture, and controlling a pick-and-place mechanism of the multi-axis robot to pick up a target material in a target loading trough and place the target material in a pick-and-place part of the multi-axis robot;

S2: controlling the multi-axis robot to transfer the target material in the pick-and-place part to a target station for processing, where a product material generated is temporarily stored at the target station; and S3: controlling the multi-axis robot to reach the target station, adjusting the pick-and-place part of the multi-axis robot to an unloading posture, and controlling the pick-and-place mechanism of the multi-axis robot to pick up the product material at the target station and place the product material into a target unloading trough.

In a feasible implementation, step S1 includes:

S11: acquiring a current position of the multi-axis robot and a first position of the target loading trough;

S12: controlling, based on a position relationship between the multi-axis robot and the target loading trough, the multi-axis robot to move to the loading position within a range of the target loading trough;

S13: adjusting the multi-axis robot to the loading posture, and picking up the target material in the target loading trough; and S14: placing the target material in the pick-and-place part of the multi-axis robot.

In a feasible implementation, step S3 includes:

S31: acquiring a current position of the multi-axis robot and a second position of the target unloading trough;

S32: controlling, based on a position relationship between the multi-axis robot and the target unloading trough, the multi-axis robot to move to an unloading position within a range of the target unloading trough;

S33: adjusting the multi-axis robot to the unloading posture, and picking up the product material at the target station; and S34: placing the product material into the target unloading trough.

Compared with the prior art, the present disclosure has the following beneficial effects:

The present disclosure ensures smooth loading and unloading. First, the present disclosure controls the multi-axis robot to move to the loading position, and adjusts the multi-axis robot to the loading posture. Then, the present disclosure controls the multi-axis robot to pick up and place the target material in the pick-and-place part, and transport the target material to the target station for processing. Finally, the present disclosure controls the multi-axis robot to transport the product material to the target unloading trough, thereby achieving the unloading operation. The present disclosure achieves loading and unloading through a tight operational process, ensures smooth material transportation through a regular and orderly transportation process, and ensures the accuracy of material transportation through an inspection task before transportation.

The technical solutions of the present disclosure will be further described in detail below with reference to drawings and embodiments.

BRIEF DESCRIPTION OF THE DRAWINGS

The drawings are provided for further understanding of the present disclosure and constitute a part of the specification. The drawings, together with the embodiments of the present disclosure, are intended to explain the present disclosure, rather than to limit the present disclosure. In the drawings.

DETAILED DESCRIPTION OF THE EMBODIMENTS

The preferred embodiments of the present disclosure are described below with reference to the drawings. It should be understood that the preferred embodiments described herein are only used to illustrate the present disclosure, rather than to limit the present disclosure.

Embodiment 1

Figure 1:
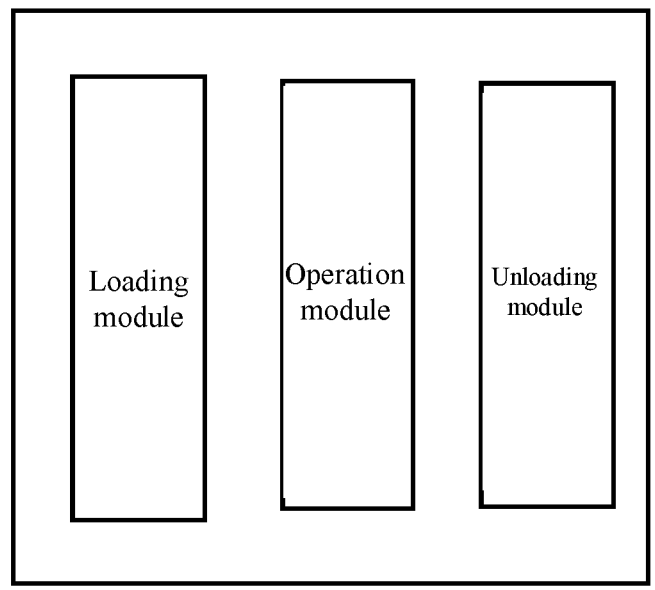
FIG. 1 is a block diagram of a control system for loading and unloading by a multi-axis robot according to an embodiment of the present disclosure.

As shown in FIG. 1, a control system for loading and unloading by a multi-axis robot includes: a loading module, an operation module, and an unloading module.

The loading module is configured to control the multi-axis robot to reach a loading position, adjust the multi-axis robot to a loading posture, and control a pick-and-place mechanism of the multi-axis robot to pick up a target material in a target loading trough and place the target material in a pick-and-place part of the multi-axis robot.

The operation module is configured to control the multi-axis robot to transfer the target material in the pick-and-place part to a target station for processing, where a product material generated is temporarily stored at the target station.

The unloading module is configured to control the multi-axis robot to reach the target station, adjust the pick-and-place part of the multi-axis robot to an unloading posture, and control the pick-and-place mechanism of the multi-axis robot to pick up the product material at the target station and place the product material into a target unloading trough.

In this embodiment, the loading position refers to a position where the target material is stored.

In this embodiment, the loading posture refers to a posture of the multi-axis robot grasping the target material.

In this embodiment, the target station refers to a station for material processing, and each station has a different processing type.

In this embodiment, the unloading posture refers to a posture of the multi-axis robot placing the product material in the target unloading trough.

The working principle and beneficial effects of the above technical means are as follows. This embodiment ensures smooth loading and unloading. First, this embodiment controls the multi-axis robot to move to the loading position, and adjusts the multi-axis robot to the loading posture. Then, this embodiment controls the multi-axis robot to pick up and place the target material in the pick-and-place part, and transport the target material to the target station for processing. Finally, this embodiment controls the multi-axis robot to transport the product material to the target unloading trough, thereby achieving the unloading operation. This embodiment achieves loading and unloading through a tight operational process, ensures smooth material transportation through a regular and orderly transportation process, and ensures the accuracy of material transportation through an inspection task before transportation.

Embodiment 2

Based on Embodiment 1, the control system for loading and unloading by a multi-axis robot further includes an emergency module.

The emergency module includes an emergency stop button, a pause button, and a start button.

The emergency module is configured to execute a corresponding task when a worker presses a designated button.

The working principle and beneficial effects of the above technical means are as follows. The emergency module is provided in order to facilitate staff control of transportation progress and avoid a serious situation in case of emergency. A corresponding task is performed when a worker presses the button, thereby achieving the purpose of human brain control of the machine.

Embodiment 3

Figure 2:
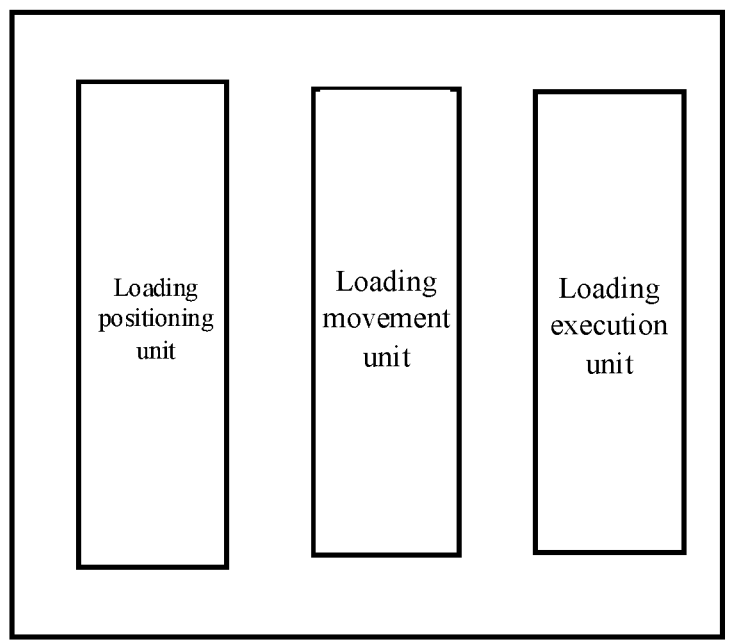
FIG. 2 is a block diagram of a loading module of the control system for loading and unloading by a multi-axis robot according to an embodiment of the present disclosure.

Based on Embodiment 1, in the control system for loading and unloading by a multi-axis robot, the loading module includes: a loading positioning unit, a loading movement unit, and a loading execution unit, as shown in FIG. 2.

The loading positioning unit is configured to acquire a current position of the multi-axis robot and a first position of the target loading trough.

The loading movement unit is configured to control, based on a position relationship between the multi-axis robot and the target loading trough, the multi-axis robot to move to the loading position within a range of the target loading trough.

The loading execution unit is configured to adjust the multi-axis robot to the loading posture, pick up the target material in the target loading trough, and place the target material in the pick-and-place part of the multi-axis robot.

In this embodiment, the first position refers to a position of the target loading trough in a factory building.

In this embodiment, the range of the target loading trough refers to a designated range centered around the target loading trough.

The working principle and beneficial effects of the above technical means are as follows. In order to ensure the accuracy of loading, the loading positioning unit analyzes the position of the target loading trough. The loading movement unit controls the multi-axis robot to move to the position of the target loading trough. The loading execution unit adjusts the multi-axis robot to the loading posture to pick up and place the target material in the pick-and-place part. In this way, the multi-axis robot can work normally and perform different actions under the control of different units, achieving continuous operation and reducing the probability of stoppage.

Embodiment 4

Figure 3:
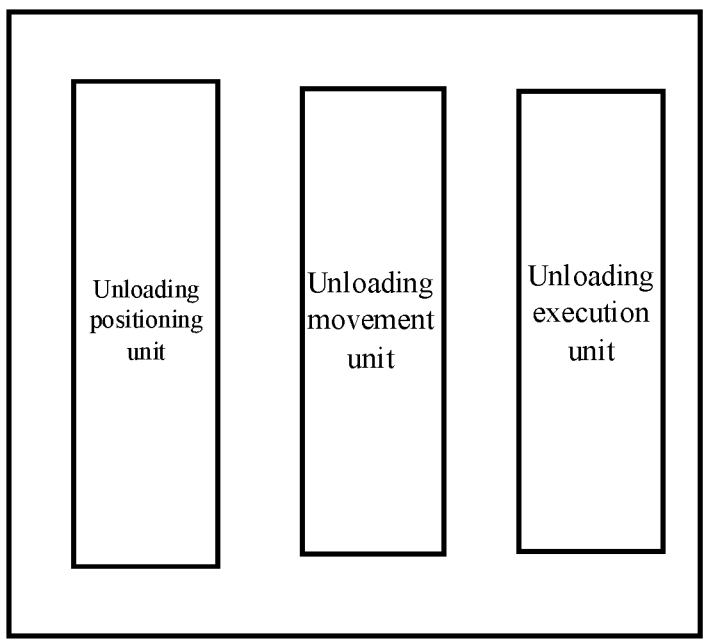
FIG. 3 is a block diagram of an unloading module of the control system for loading and unloading by a multi-axis robot according to an embodiment of the present disclosure.

Based on Embodiment 1, in the control system for loading and unloading by a multi-axis robot, the unloading module includes: an unloading positioning unit, an unloading movement unit, and an unloading execution unit, as shown in FIG. 3.

The unloading positioning unit is configured to acquire a current position of the multi-axis robot and a second position of the target unloading trough.

The unloading movement unit is configured to control, based on a position relationship between the multi-axis robot and the target unloading trough, the multi-axis robot to move to an unloading position within a range of the target unloading trough.

The unloading execution unit is configured to adjust the multi-axis robot to the unloading posture, pick up the product material at the target station, and place the product material into the target unloading trough.

In this embodiment, the second position refers to a position of the target unloading trough in the factory building.

In this embodiment, the unloading posture refers to a posture of the multi-axis robot picking up the product material at the target station.

In this embodiment, the product material refers to a new material generated after a certain operation is performed on the target material.

The working principle and beneficial effects of the above technical means are as follows. In order to successfully complete the unloading task, the unloading positioning unit analyzes the position relationship between the multi-axis robot and the target unloading trough before performing the unloading task. The unloading execution unit controls the multi-axis robot to pick up and product material. The unloading movement unit controls the multi-axis robot to carry the product material to the unloading position, thereby achieving unloading. The design realizes the unloading task, and the unloading work is connected to the loading work. That is, when the multi-axis robot completes a loading task, it can complete an unloading task in a timely manner, reducing the number of robot movements and improving the efficiency of loading and unloading.

Embodiment 5

Based on Embodiment 1, in the control system for loading and unloading by a multi-axis robot, the operation module includes: a control unit, a visual unit, and an analysis and operation unit.

The control unit is configured to control the multi-axis robot to enter a range of the target station.

The visual unit is configured to acquire a range video stream generated when the multi-axis robot enters the range of the target station.

The analysis and operation unit is configured to:
analyze the range video stream, adjust a position of the pick-and-place part, and transfer the target material in the pick-and-place part to the target station for processing; and
determine, based on the range video stream, whether there is a product material generated at the target station; and place, if there is a product material generated at the target station, the product material at a designated position of the target station for temporary storage.

The working principle and beneficial effects of the above technical means are as follows. In order to protect the material, that is, to avoid collision of the material and generation of a defective product, the position relationship between the multi-axis robot and the target station is analyzed when the material is moved to the target station. The position of the multi-axis robot is adjusted to ensure smooth placement of the product material at the target station, and the product material at the target station is then placed in at a designated position for temporary storage. The design achieves streamlined operation and accelerates the operation process.

Embodiment 6

Based on Embodiment 3, in the control system for loading and unloading by a multi-axis robot, the loading module further includes: a loading analysis unit.

The loading positioning unit is further configured to:
mark the first position on a preset scene plan;
analyze a standard material type of the target material stored in the target loading trough corresponding to the first position;
calculate a first quantity of the standard material type, and acquire a standard material contour corresponding to each standard material type; and
generate a comparison layer based on each standard material contour, and gather all comparison layers to establish a material analysis model.

The loading analysis unit is configured to:
acquire a loading image of the loading position when the multi-axis robot is adjusted to the loading posture;
down-sample the loading image, and generate a sampling image based on a sampling result;
input the sampling image into the material analysis model, mark a material contour in the sampling image, generate a comparison image, and acquire a comparison result generated when the sampling image is passed through each comparison layer;
analyze the comparison result, calculate a quantity of a type of an existing target material in the target loading trough as a second quantity, and determine whether the second quantity is equal to the first quantity;
if the second quantity is not equal to the first quantity:
analyze a convergence value of a preset interpolation function based on a specification of the sampling image;
match the convergence value with an interpolation method, and interpolate the comparison image by the interpolation method to generate an interpolated image;
acquire an interpolated material contour from the interpolated image, pair the interpolated material contour with each standard material contour, and extract a failed standard material contour as a target standard material contour; and acquire a target standard material type corresponding to the target standard material contour.

The loading execution unit is further configured to acquire a storage region of the target standard material type in the preset scene plan, and control the multi-axis robot to move to the storage region to execute a replenishment task.

In this embodiment, the loading image refers to an image of the target loading trough.

In this embodiment, the preset scene plan refers to a plan formed by proportionally scaling all objects in the factory building according to an actual situation of the factory building.

In this embodiment, the standard material type refers to a standard material type corresponding to each standard material stored in the target loading trough.

In this embodiment, the first quantity refers to a quantity of the standard material stored in the target loading trough.

In this embodiment, the comparison layer refers to a comparison platform that regards the standard material contour as a reference for comparison.

In this embodiment, down-sampling refers to an operation of reducing the loading image to a preset specification.

In this embodiment, the second quantity refers to a quantity of the material contour in the sampling image.

In this embodiment, regarding the convergence value, a value range of the preset interpolation function is limited by the specification of the sampling image, such that all function values within the limited value range are converged to a fixed value.

In this embodiment, the interpolation method includes a nearest neighbor method, a bilinear interpolation method, and a cubic interpolation method.

In this embodiment, the interpolation method is matched based on the convergence value as follows. When a dispersion degree between the convergence value and the function value is [0,2.5], the nearest neighbor method is used. When the dispersion degree between the convergence value and the function value is negative, the cubic interpolation method is used. In other cases, the bilinear interpolation method is used.

In this embodiment, the replenishment task refers to a task of transporting the material from the storage region to the target loading trough to make the material in the target loading trough sufficient.

The working principle and beneficial effects of the above technical means are as follows. In order to ensure that the target material in the target loading trough is in a sufficient state and that the multi-axis robot completes the loading task smoothly, before the loading task is executed, the loading image of the target loading trough is acquired and analyzed to determine whether the standard material in the target loading trough is sufficient. Then, according to an actual situation, the replenishment task is executed so as to provide a sufficient material for a subsequent loading process and ensure the smooth progress of processing.

Embodiment 7

Based on Embodiment 5, in the control system for loading and unloading by a multi-axis robot, the analysis and operation unit includes: a first generation subunit and a second generation subunit.

The first generation subunit is configured to:
frame the range video stream to generate a range image set;
perform global motion estimation on each frame of range image in the range image set, and acquire an estimated motion amount corresponding to each frame of range image; and
establish a rectangular coordinate system, input all estimated motion amounts to an X axis, acquire a trend value of all the estimated motion amounts, de-jitter each frame of range image based on the trend value to acquire a processed range image, and generate a stable image set.

The second generation subunit is configured to:
extract an end-frame image of the stable image set, mark a first image position of the target station and a second image position of the pick-and-place part in the end-frame image;
establish an initial motion path based on the first image position and the second image position;
acquire a background region of the end-frame image;
determine whether an overlap between the initial motion path and the background region is less than a preset overlap;
if the overlap between the initial motion path and the background region is less than the preset overlap: analyze the initial motion path, and extract a non-overlapped sub-path;
acquire an adjustment distance, corresponding to the background region, of each path point on the non-overlapped sub-path;
sort the adjustment distance in reverse order, take the path point as a path inflection based on a sorting result, and adjust a direction of each path inflection in order until the non-overlapped sub-path is overlapped with the background region, and generate a corrected motion path;
acquire, based on a volume of the multi-axis robot, an activity range of the multi-axis robot moving along the corrected motion path, adjust a position relationship between the corrected motion path and a foreground region based on the activity range, and generate a final motion path;
if the overlap between the initial motion path and the background region is greater than or equal to the preset overlap: regard the initial motion path as the corrected motion path, adjust the position relationship between the corrected motion path and the foreground region, and generate the final motion path; and
control the multi-axis robot to move the pick-and-place part to the target position according to the final motion path.

In this embodiment, the framing refers to a process of segmenting the range video stream into images.

In this embodiment, the global motion estimation refers to a process of estimating a motion amount of all objects in an entire frame of range image.

In this embodiment, the estimated motion amount refers to a motion amount per unit time acquired through the global motion estimation during a motion process of the multi-axis robot.

In this embodiment, regarding de-jittering, based on the estimated motion amount of the image, a noise between two adjacent range images (i.e., a motion amount in other direction except for a forward direction of the multi-axis robot) is eliminated, and only the motion amount in the forward direction of the multi-axis robot is retained.

In this embodiment, the trend value refers to a weighted mean of all estimated motion amounts.

In this embodiment, the end-frame image refers to an image when the multi-axis robot reaches the first position.

In this embodiment, the initial motion path refers to a path formed by connecting the first image position and the second image position.

In this embodiment, the background region refers to an object-free region.

In this embodiment, the non-overlapped sub-path refers to a sub-path, overlapped with the foreground region, in the initial motion path.

In this embodiment, the path inflection refers to a point at which a path direction is adjusted.

The working principle and beneficial effects of the above technical means are as follows. In order to ensure that the multi-axis robot smoothly transports the material from the pick-and-place part to the target station, image analysis is conducted to determine whether the position of the multi-axis robot is reasonable. The motion path of the multi-axis robot is adjusted according to the actual situation, ensuring that the multi-axis robot does not collide with other object when moving along the motion path and that the motion path is the shortest. The design can improve the work efficiency of the multi-axis robot and ensure that the multi-axis robot completes a transportation task within a limited time.

Embodiment 8

Based on Embodiment 7, in the control system for loading and unloading by a multi-axis robot, the analysis and operation unit performs global motion estimation on each frame of range image in the range image set, and acquires an estimated motion amount corresponding to each frame of range image. This process includes the following steps.

A motion variation of an nth frame of range image relative to an (n−1)th frame of range image is calculated according to Eq. M.

$$L_n = \frac{\sum_{a=1}^{A}\sum_{b=1}^{B} K_n(a,b) - K_{n-1}(\acute{a},\acute{b})}{\sqrt{\sum_{a=1}^{A}\sum_{b=1}^{B} K_n^2(a,b)} - \sqrt{\sum_{b=1}^{A}\sum_{b=1}^{B} K_{n-1}^2(\acute{a},\acute{b})}}$$

$L_n$ denotes the motion variation of the nth frame of range image relative to the (n−1)th frame of range image; $K_n(a, b)$ denotes a pixel value of pixel point (a, b) on the nth frame of range image; $K_{n-1}(\acute{a}, \acute{b})$ denotes a pixel value of pixel point (aá, b) corresponding to (a, b) on the (n−1)th frame of range image; A denotes a width of the range image; and B denotes a length of the range image.

A first frame of range image is analyzed, and all object contours in the first frame of range image are acquired.

A similarity between each object contour and a remaining object contour is acquired, and a target object contour with a lowest similarity is extracted.

The target object contour is taken as a query basis, an image position of the target object contour on each range image is marked, and a contour center point corresponding to each target object contour is determined.

All marked range images are input into a preset coordinate system, and corresponding center coordinates of each range center point in the preset coordinate system are acquired.

An angle variation of the nth frame of range image relative to the (n−1)th frame of range image is calculated according to Eq. (II):

$$\alpha_n = \arctan \frac{y_n - y_{n-1}}{x_n - x_{n-1}}$$

$\alpha_n$ denotes the angle variation of the nth frame of range image relative to the (n−1)th frame of range image; arctan denotes an inverse trigonometric function; $y_n$ denotes an ordinate of the range center point of the nth frame of range image in the preset coordinate system; $y_{n-1}$ denotes an ordinate of the range center point of the (n−1)th frame of range image in the preset coordinate system; $x_n$ denotes an abscissa of the range center point of the nth frame of range image in the preset coordinate system; and $x_{n-1}$ denotes an abscissa of the range center point of the (n−1)th frame of range image in the preset coordinate system.

According to the calculation results of Eqs. (I) and (II), the estimated motion amount corresponding to each range image is acquired.

The working principle and beneficial effects of the above technical means are as follows. The global motion estimation of the image is the implementation basis for de-jittering. Therefore, in order to ensure the accuracy of the global motion estimation, it is needed to accurately calculate the motion and angle variations of each range image according to the equations during specific implementation, and then generate the estimated motion amount. The design greatly improves the accuracy of the global motion estimation and further enhances the de-jittering effect. In addition, the equation calculations are quick, avoiding a complex derivation process, and achieving zero-time calculation.

Embodiment 9

Figure 4:
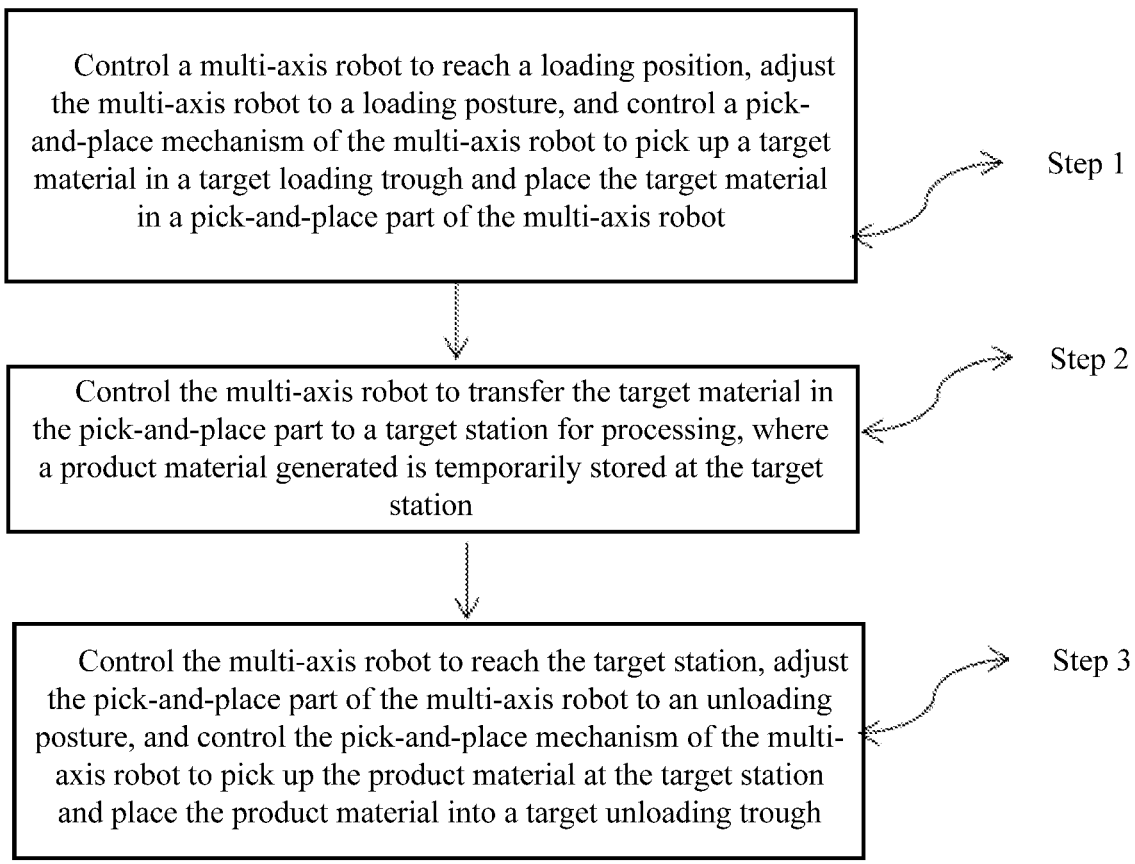
FIG. 4 is a flowchart of a control method for loading and unloading by a multi-axis robot according to an embodiment of the present disclosure.

As shown in FIG. 4, a control method for loading and unloading by a multi-axis robot includes the following steps.

S1. The multi-axis robot is controlled to reach a loading position, adjusting the multi-axis robot to a loading posture, and a pick-and-place mechanism of the multi-axis robot is controlled to pick up a target material in a target loading trough and place the target material in a pick-and-place part of the multi-axis robot.

S2. The multi-axis robot is controlled to transfer the target material in the pick-and-place part to a target station for processing, where a product material generated is temporarily stored at the target station.

S3. The multi-axis robot is controlled to reach the target station, the pick-and-place part of the multi-axis robot is adjusted to an unloading posture, and the pick-and-place mechanism of the multi-axis robot is controlled to pick up the product material at the target station and place the product material into a target unloading trough.

The working principle and beneficial effects of the above technical means are as follows. The control method is formed based on the control system of Embodiment 1, and includes a complete set of steps, reflecting the practicability of the multi-axis robot for loading and unloading.

Embodiment 10

Based on Embodiment 9, in the control method for loading and unloading by a multi-axis robot, step S1 includes the following process.

S11. A current position of the multi-axis robot and a first position of the target loading trough are acquired.

S12. based on a position relationship between the multi-axis robot and the target loading trough, the multi-axis robot is controlled to move to the loading position within a range of the target loading trough.

S13. The multi-axis robot to the loading posture is adjusted, and the target material in the target loading trough is picked up.

S14. The target material is placed in the pick-and-place part of the multi-axis robot.

The working principle and beneficial effects of the above technical means are as follows. In order to further improve the execution of the loading process, the loading process is divided into multiple steps to make the multi-axis robot orderly work.

Embodiment 11

Based on Embodiment 9, in the control method for loading and unloading by a multi-axis robot, step S3 includes the following process.

S31. A current position of the multi-axis robot and a second position of the target unloading trough are acquired.

S32. Based on a position relationship between the multi-axis robot and the target unloading trough, the multi-axis robot is controlled to move to an unloading position within a range of the target unloading trough.

S33. The multi-axis robot is adjusted to the unloading posture, and the product material at the target station is picked up.

S34. The product material is placed into the target unloading trough.

The working principle and beneficial effects of the above technical means are as follows. The unloading process is divided into multiple steps to ensure stable unloading.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A control system for loading and unloading by a multi-axis robot, comprising:
a loader that controls the multi-axis robot to reach a loading position, adjust the multi-axis robot to a loading posture, and controls a pick-and-placer of the multi-axis robot to pick up a target material in a target loading trough and place the target material in a pick-and-place part of the multi-axis robot;
an operator that controls the multi-axis robot to transfer the target material in the pick-and-place part to a target station for processing, wherein a product material generated is temporarily stored at the target station; and
an unloader that controls the multi-axis robot to reach the target station, adjust the pick-and-place part of the multi-axis robot to an unloading posture, and control the pick-and-placer of the multi-axis robot to pick up the product material at the target station and place the product material into a target unloading trough;
wherein the operator comprises:
a controller that controls the multi-axis robot to enter a range of the target station;
a visualizer that acquires a range video stream generated when the multi-axis robot enters the range of the target station; and
an analysis and operator configured to:
analyze the range video stream, adjust a position of the pick-and-place part, and transfer the target material in the pick-and-place part to the target station for processing; and
determine, based on the analysis of the range video stream, whether there is the product material generated at the target station; and place, if there is the product material generated at the target station, the product material at a designated position of the target station for temporary storage;
wherein the analysis and operator comprises:
a first generator that:
frames the range video stream to generate a range image set;
performs a global motion estimation on each frame of range image in the range image set, and acquires an estimated motion amount corresponding to each frame of range image; and
establishes a rectangular coordinate system, input all estimated motion amounts of the multi-axis robot in a forward direction to an X axis, acquires a trend value of all the estimated motion amounts, de-jitter each frame of range image based on the trend value to acquire a processed range image, and generates a stable image set, wherein the stable image set comprises a collection of processed range images that have been de-jittered such that any apparent motion relative to preceding and subsequent frames are removed other than motion along the forward direction of the multi-axis robot; and
a second generator that:
extracts an end-frame image of the stable image set, marks a first image position of the target station and a second image position of the pick-and-place part in the end-frame image;
establishes an initial motion path based on the first image position and the second image position;
acquires a background region of the end-frame image;
determines whether an overlap between the initial motion path and the background region is less than a preset overlap;
if the overlap between the initial motion path and the background region is less than the preset overlap:
analyzes the initial motion path, and extract a non-overlapped sub-path;
acquires an adjustment distance, corresponding to the background region, of each path point on the non-overlapped sub-path;
sorts the adjustment distance in reverse order, takes the path point as a path inflection based on a sorting result, and adjusts a direction of each path inflection in order until the non-overlapped sub-path is overlapped with the background region, and generates a corrected motion path;
acquires, based on a working area of the multi-axis robot, an activity range within the working area of the multi-axis robot moving along the corrected motion path, adjust a position relationship between the corrected motion path and a foreground region, based on the activity range, and generates a final motion path;
if the overlap between the initial motion path and the background region is greater than or equal to the preset overlap: regards the initial motion path as the corrected motion path, adjusts the position relationship between the corrected motion path and the foreground region, and generates the final motion path; and controls the multi-axis robot to move the pick-and-place part to a target position according to the final motion path.

2. The control system according to claim 1, further comprising an emergency module, wherein the emergency module comprises an emergency stop button, a pause button, and a start button; and the emergency module is configured to execute a task when a worker presses a designated button.

3. The control system according to claim 1, wherein the loader comprises:

a loading positioner that acquires a current position of the multi-axis robot and a first position of the target loading trough;

a loading mover that controls, based on a position relationship between the multi-axis robot and the target loading trough, the multi-axis robot to move to the loading position within a range of the target loading trough; and a loading executor that adjusts the multi-axis robot to the loading posture, pick up the target material in the target loading trough, and place the target material in the pick-and-place part of the multi-axis robot.

4. The control system according to claim 1, wherein the unloader comprises:

an unloading positioner acquire a current position of the multi-axis robot and a second position of the target unloading trough;

an unloading mover that controls, based on a position relationship between the multi-axis robot and the target unloading trough, the multi-axis robot to move to an unloading position within a range of the target unloading trough; and an unloading executor that adjusts the multi-axis robot to the unloading posture, pick up the product material at the target station, and place the product material into the target unloading trough.

* * * * *